United States Patent
Hue et al.

(10) Patent No.: US 10,195,982 B2
(45) Date of Patent: Feb. 5, 2019

(54) DRIVING ASSISTANCE METHOD AND DEVICE

(71) Applicant: Valeo Vision, Bobigny (FR)

(72) Inventors: David Hue, Butry sur Oise (FR); Hafid El Idrissi, Pantin (FR); Etienne Monchy, Herblay (FR)

(73) Assignee: VALEO VISION, Bobigny (FR)

( * ) Notice: Subject to any disclaimer, the term of this patent is extended or adjusted under 35 U.S.C. 154(b) by 324 days.

(21) Appl. No.: 15/022,669

(22) PCT Filed: Sep. 26, 2014

(86) PCT No.: PCT/EP2014/070626
§ 371 (c)(1),
(2) Date: Mar. 17, 2016

(87) PCT Pub. No.: WO2015/044349
PCT Pub. Date: Apr. 2, 2015

(65) Prior Publication Data
US 2017/0001553 A1    Jan. 5, 2017

(30) Foreign Application Priority Data
Sep. 26, 2013   (FR) ...................................... 13 59267

(51) Int. Cl.
*B60Q 1/14*    (2006.01)
*B60J 3/02*    (2006.01)
(Continued)

(52) U.S. Cl.
CPC ............ *B60Q 1/143* (2013.01); *B60J 3/0291* (2013.01); *G02F 1/0121* (2013.01);
(Continued)

(58) Field of Classification Search
CPC ...... B60Q 1/143; B60J 3/0291; G02F 1/0121; H05B 37/0227; H05B 37/0272
(Continued)

(56) References Cited

U.S. PATENT DOCUMENTS 3,199,114 A * 8/1965 Malifaud ................... B60J 3/02
296/97.2
3,961,181 A * 6/1976 Golden ...................... B60J 3/04
250/208.2
(Continued)

FOREIGN PATENT DOCUMENTS

CN    301804989    1/2012
CN    102707456    10/2012
(Continued)

OTHER PUBLICATIONS

U.S. Pat. No. 3,199,114, Aug. 3, 1965, Malifaud, Device for Eliminating the Glare of Automobile Headlights.
(Continued)

*Primary Examiner* — Bryon T Gyllstrom
(74) *Attorney, Agent, or Firm* — Oblon, McClelland, Maier & Neustadt, L.L.P.

(57) ABSTRACT

A device for assisting with driving an automotive vehicle, the vehicle being equipped with at least one illuminating device able to emit a beam for illuminating a road scene (SR) in front of the vehicle, the assisting device comprising a variable transmission screen that is intended to be placed between the road scene (SR) and a driver of the vehicle, the assisting device being configured to, when active, control a light emission of at least one light source of the illuminating device and a transmission coefficient of the variable transmission screen, in relation to each other, with a pulsed signal, characterized in that the assisting device is configured to detect a vehicle equipped with a device of the same type via inter-vehicle communication and to modify the
(Continued)

pulsed signal so as to avoid antiphase and/or phase effects, when the device detects such a vehicle.

20 Claims, 2 Drawing Sheets

(51) Int. Cl.
    *G02F 1/01* (2006.01)
    *H05B 37/02* (2006.01)
(52) U.S. Cl.
    CPC ..... *H05B 37/0227* (2013.01); *H05B 37/0272* (2013.01); *B60Q 2300/20* (2013.01); *B60Q 2300/42* (2013.01); *B60Q 2300/43* (2013.01); *B60Q 2300/47* (2013.01)
(58) Field of Classification Search
    USPC .......................................................... 362/459
    See application file for complete search history.

(56) References Cited

U.S. PATENT DOCUMENTS

| | | | |
|---|---|---|---|
| 4,286,308 A * | 8/1981 | Wolff | F21S 41/13 |
| | | | 362/465 |
| 4,311,368 A | 1/1982 | Saito et al. | |
| 4,848,890 A | 7/1989 | Horn | |
| 5,258,607 A * | 11/1993 | Agostini | A42B 3/226 |
| | | | 250/201.1 |
| 5,276,539 A | 1/1994 | Humphrey | |
| 5,486,938 A * | 1/1996 | Aigrain | B60J 3/04 |
| | | | 349/116 |
| 5,671,035 A | 9/1997 | Barnes | |
| 5,835,458 A | 11/1998 | Bischel et al. | |
| 5,859,735 A * | 1/1999 | De Vries | G02B 5/23 |
| | | | 313/478 |
| 5,911,018 A | 6/1999 | Bischel et al. | |
| 5,978,524 A | 11/1999 | Bischel et al. | |
| 6,078,704 A | 6/2000 | Bischel et al. | |
| 6,118,908 A | 9/2000 | Bischel et al. | |
| 6,133,686 A | 10/2000 | Inoue et al. | |
| 6,141,465 A | 10/2000 | Bischel et al. | |
| 6,313,587 B1 | 11/2001 | MacLennan et al. | |
| 6,384,982 B1 | 5/2002 | Spitzer | |
| 6,424,448 B1 | 7/2002 | Levy | |
| 6,493,128 B1 | 12/2002 | Agrawal et al. | |
| 6,522,794 B1 | 2/2003 | Bischel et al. | |
| 6,557,995 B1 | 5/2003 | Edwards | |
| 6,568,738 B1 | 5/2003 | Braun | |
| 6,624,564 B2 | 9/2003 | Wang et al. | |
| 6,626,532 B1 | 9/2003 | Nishioka et al. | |
| 6,928,180 B2 | 8/2005 | Stam et al. | |
| 7,134,707 B2 | 11/2006 | Isaac | |
| 7,684,105 B2 | 3/2010 | Lamontagne et al. | |
| 7,751,122 B2 | 7/2010 | Amitai | |
| 7,874,666 B2 | 1/2011 | Xu et al. | |
| 7,893,890 B2 | 2/2011 | Kelly et al. | |
| 7,970,172 B1 * | 6/2011 | Hendrickson | B60J 3/04 |
| | | | 280/735 |
| 8,197,931 B2 | 6/2012 | Ueda et al. | |
| 8,208,504 B2 | 6/2012 | Dantus et al. | |
| 8,233,102 B2 | 7/2012 | Burlingame et al. | |
| D665,009 S | 8/2012 | Nibauer et al. | |
| D717,865 S | 11/2014 | Votel et al. | |
| 8,964,298 B2 | 2/2015 | Haddick et al. | |
| 8,976,084 B2 | 3/2015 | Hamdani et al. | |
| D734,808 S | 7/2015 | Markovitz et al. | |
| 9,087,471 B2 | 7/2015 | Miao | |
| D735,799 S | 8/2015 | Markovitz et al. | |
| 9,186,963 B2 | 11/2015 | Tewari et al. | |
| D746,362 S | 12/2015 | Markovitz et al. | |
| D747,403 S | 1/2016 | Markovitz et al. | |
| 9,277,159 B2 | 3/2016 | Shin et al. | |
| D763,944 S | 8/2016 | Shin | |
| D765,761 S | 9/2016 | Votel et al. | |
| D769,358 S | 10/2016 | Markovitz et al. | |
| D769,362 S | 10/2016 | Markovitz et al. | |
| D769,962 S | 10/2016 | Markovitz et al. | |
| 9,511,650 B2 | 12/2016 | Momot | |
| 2002/0175615 A1 | 11/2002 | Wang et al. | |
| 2006/0140502 A1 | 6/2006 | Tseng et al. | |
| 2006/0175859 A1 | 8/2006 | Isaac | |
| 2007/0285759 A1 | 12/2007 | Ash et al. | |
| 2008/0186604 A1 | 8/2008 | Amitai | |
| 2008/0218434 A1 | 9/2008 | Kelly et al. | |
| 2009/0213282 A1 | 8/2009 | Burlingame et al. | |
| 2009/0213283 A1 | 8/2009 | Burlingame et al. | |
| 2010/0065721 A1 | 3/2010 | Broude et al. | |
| 2010/0161177 A1 | 6/2010 | Yuter | |
| 2010/0194857 A1 | 8/2010 | Mentz et al. | |
| 2011/0072961 A1 | 3/2011 | Jungkuist et al. | |
| 2011/0233384 A1 | 9/2011 | Wu et al. | |
| 2011/0288725 A1 | 11/2011 | Yuter | |
| 2012/0019891 A1 * | 1/2012 | Dewell | G02F 1/163 |
| | | | 359/275 |
| 2012/0026071 A1 | 2/2012 | Hamdani et al. | |
| 2012/0044560 A9 | 2/2012 | Lam et al. | |
| 2012/0126099 A1 * | 5/2012 | Tewari | B60J 3/04 |
| | | | 250/214 D |
| 2012/0180204 A1 | 7/2012 | Hawkins | |
| 2012/0303214 A1 | 11/2012 | Yuter | |
| 2013/0113973 A1 | 5/2013 | Miao | |
| 2013/0127980 A1 | 5/2013 | Haddick et al. | |
| 2013/0300911 A1 * | 11/2013 | Beckman | G02B 27/0101 |
| | | | 348/335 |
| 2014/0153076 A1 | 4/2014 | Tewari et al. | |
| 2014/0109302 A1 | 6/2014 | Casbi et al. | |
| 2014/0253816 A1 | 9/2014 | Shin et al. | |
| 2015/0062469 A1 | 3/2015 | Fleury | |
| 2015/0077826 A1 | 3/2015 | Beckman | |
| 2016/0077400 A1 | 3/2016 | Lam et al. | |
| 2016/0214467 A1 | 7/2016 | El Idrissi et al. | |
| 2016/0216536 A1 | 7/2016 | Hue et al. | |
| 2016/0223816 A1 | 8/2016 | Hue et al. | |
| 2016/0357014 A1 | 12/2016 | Beckman | |
| 2017/0023802 A1 | 1/2017 | El Idrissi et al. | |

FOREIGN PATENT DOCUMENTS

| | | |
|---|---|---|
| DE | 2001086 A1 | 7/1971 |
| DE | 3836095 A1 | 4/1990 |
| DE | 102012008913 | 11/2012 |
| EP | 0341519 | 11/1989 |
| EP | 0459433 | 12/1991 |
| EP | 0498143 | 8/1992 |
| EP | 0945303 A1 | 9/1999 |
| FR | 2684770 | 6/1993 |
| FR | 2693562 | 1/1994 |
| FR | 2722581 | 1/1996 |
| FR | 2781289 | 1/2000 |
| FR | 2846756 | 5/2004 |
| FR | 2941786 | 8/2010 |
| FR | 2975792 | 11/2012 |
| FR | 2976089 | 12/2012 |
| FR | 2988493 | 9/2013 |
| FR | 3010941 | 3/2015 |
| FR | 3011091 | 3/2015 |
| GB | 2420183 | 5/2006 |
| GB | 2445365 | 7/2008 |
| JP | 2004233908 | 8/2004 |
| WO | WO 9210130 | 6/1992 |
| WO | WO 9214625 | 9/1992 |
| WO | WO 9512502 | 5/1995 |
| WO | WO 9620846 | 7/1996 |
| WO | WO 9827452 | 6/1998 |
| WO | WO 2012036638 | 3/2012 |
| WO | WO 2012115301 | 8/2012 |

OTHER PUBLICATIONS

U.S. Pat. No. 3,961,181, Jun. 1, 1976, Golden, Eye-Shading Means for Automotive Vehicle Operators.

(56) References Cited

OTHER PUBLICATIONS

U.S. Pat. No. 4,286,308, Aug. 25, 1981, Wolff, Apparatus and Method for Reducing Headlight Glare.
U.S. Pat. No. 4,311,368, Jan. 19, 1982, Saito et al., Light Shielding Material.
U.S. Pat. No. 4,848,890, Jul. 18, 1989, Horn, Visor With Point Sun Blocking.
U.S. Pat. No. 5,258,607, Nov. 2, 1993, Agostini et al., Active Anti-Dazzle Device for the Drivers of Cars and Other Motor Vehicles Having an Electro-Sensitive Screen.
U.S. Pat. No. 5,276,539, Jan. 4, 1994, Humphrey, Method and Apparatus for Controlling Perceived Brightness Using a Time Varying Shutter.

\* cited by examiner

DRIVING ASSISTANCE METHOD AND DEVICE

CROSS-REFERENCE TO RELATED APPLICATIONS

This application is the U.S. National Phase application of PCT Application No. PCT/EP2014/070626 filed Sep. 26, 2014, which claims priority to the French application 1359267 filed on Sep. 26, 2013, which applications are incorporated herein by reference and made a part hereof.

BACKGROUND OF THE INVENTION

1. Field of the Invention

The invention relates to a device for assisting with driving an automotive vehicle. The invention also relates to a method for assisting with driving an automotive vehicle.

The present invention relates to methods and devices that are intended to provide assistance with driving automotive vehicles, particularly when exterior luminosity is low and requires lights to be turned on.

2. Description of the Related Art

The light beams emitted by the illuminating devices with which vehicles are equipped are regulated by international regulations that set maximum and minimum allowable intensities, for example on a screen placed away from and on the axis of the illuminating device. These regulations have the aim of simultaneously:

- providing the driver of the vehicle equipped with the illuminating device with a satisfactory illumination of the road scene toward which he is driving, so that he is able to apprehend his environment under the best possible conditions, and
- ensuring that drivers of other vehicles are not dazzled, whether they are driving in the opposite direction (approaching vehicles) or in the same direction (vehicles in front).

With the aim of meeting these regulatory aims and with a view to improving the comfort and safety of the driver, a plurality of solutions have been proposed. One thereof consists in using a device for assisting with driving composed of a pulsed illumination source synchronized with a variable transmission screen, in such a way that the illumination reaches its maximum value when the transmission coefficient of the screen reaches its maximum value, i.e. a maximum transparency, and in such a way that the illumination reaches its minimum value when the transmission coefficient of the variable transmission screen reaches its minimum value, i.e. a minimum transparency.

Thus, by virtue of this synchronization, the driver benefits completely from his lights, while decreasing the risk of being dazzled by exterior light sources, because the vision of the driver is greatly restricted when the transparency of the variable transmission screen is at its minimum.

Furthermore, the pulsed illumination does not dazzle the drivers of other vehicles since they perceive only an average illumination that is set to meet the aforementioned regulations.

Particular problems arise when the vehicle equipped with the device described above meets an approaching vehicle equipped with a device of the same type. In particular:

When the two vehicles are in antiphase, i.e. when the transmission coefficient of the variable transmission screen of the vehicle is at its minimum while the lights of the other vehicle are emitting light, the driver is unable to see (or is able to see but not as well) the lights of the other vehicle.

When the two vehicles are in phase, i.e. when their lights emit light at the same time and the transmission coefficients of their variable transmission screens are at their maximum at the same time, the drivers may be discomforted by the lights of the other vehicle.

SUMMARY OF THE INVENTION

The invention aims to mitigate at least some of the drawbacks of these known devices for assisting with driving.

To do this, the invention relates to a device for assisting with driving an automotive vehicle, the vehicle being equipped with at least one illuminating device able to emit a beam for illuminating a road scene in front of the vehicle, the assisting device comprising a variable transmission screen that is intended to be placed between the road scene and a driver of the vehicle, the assisting device being configured to, when active, control a light emission of at least one light source of the illuminating device and a transmission coefficient of the variable transmission screen, in relation to each other, with a pulsed signal.

According to the invention, the assisting device is configured to detect a vehicle equipped with a device of the same type via inter-vehicle communication and to modify the pulsed signal so as to avoid antiphase and/or phase effects, when the device detects such a vehicle.

The expression "device of the same type" is understood to mean a device for assisting with driving an automotive vehicle, the vehicle being equipped with at least one illuminating device able to emit a beam for illuminating a road scene in front of the vehicle, the assisting device comprising a variable transmission screen that is intended to be placed between the road scene and a driver of the vehicle, the assisting device being configured to, when active, synchronously control a light emission of at least one light source of the illuminating device and a transmission coefficient of the variable transmission screen with a pulsed signal that will possibly be the same as that of the first vehicle.

A device according to the invention therefore makes it possible to prevent antiphase and phase effects by modifying the pulsed signal once a vehicle equipped with a device of the same type is detected nearby.

In the rest of the description, the expression "approaching vehicle" will sometimes be used to designate the vehicle equipped with a device of the same type located nearby. Nevertheless, this expression should not be considered to restrictively designate a vehicle arriving from in front of the vehicle equipped with the device according to the invention, but rather should also be considered to designate any vehicle equipped with a device of the same type, owing to which antiphase and/or phase effects will possibly appear and hinder the driving of the vehicle equipped with the device according to the invention, for example a vehicle arriving from the right or left at an intersection, a vehicle following behind or an overtaking vehicle, the device according to the invention being suitable for detecting the presence of vehicles in the one or more directions in which these vehicles are liable to be found.

Advantageously and according to the invention, the assisting device comprises means for exchanging data wirelessly between vehicles, in order to detect vehicles equipped with a device of the same type. Such a solution ensures a device according to the invention has a good anticipation.

Specifically, inter-vehicle communication allows approaching vehicles to be detected at a large distance, at least equal to or larger than the range of the high beams of approaching vehicles, and therefore the pulsed signal to be modified according to the invention before the aforementioned problems arise. In addition, this solution has the advantage of making use of means located entirely on board the vehicle.

Advantageously and according to the invention, the device detects the frequency and/or the phase of the illuminating beam originating from the approaching vehicle equipped with a device of the same type.

According to this aspect of the invention, the assisting device gathers information on the frequency and/or phase of the illuminating beam originating from the approaching vehicle in order to adapt the modification of the pulsed signal depending on the detected frequency and/or phase.

Advantageously and according to the invention, the assisting device is configured to modify the pulsed signal by applying a phase shift thereto.

According to this aspect of the invention, the modification consists only of a phase change and makes it possible to work at a fixed frequency.

Advantageously and according to the invention, the phase-shift value (Phi) is chosen pseudo-randomly, for example using any generator of pseudo-random values known to those skilled in the art.

According to this aspect of the invention, if an approaching vehicle is equipped with a device of the same type that also uses a phase-shift modification when approached, there is a lower risk of still generating the antiphase and phase effects that would be generated if the two vehicles used the same phase-shift parameters.

Advantageously and according to the invention, the device is configured:
  to emit a recognition signal in case of detection of a vehicle equipped with a device of the same type, known as a detected vehicle;
  to receive a receipt acknowledgement signal from the detected vehicle; and
  to modify the pulsed signal on receipt of the receipt acknowledgement.

According to this aspect of the invention, only one of the vehicles modifies its pulsed signal; this thus ensures that the same modification is not made in each approaching vehicle.

Advantageously and according to the invention, the device is configured to control the transmission coefficient of the variable transmission screen so that the transparency of the variable transmission screen is maximized when the device detects an illuminating beam originating from an approaching vehicle equipped with a device of the same type.

According to this aspect of the invention, the screen is made transparent while a pulsed illumination is preserved, thereby allowing the driver to see all the light sources without or with very little attenuation, and especially to see the illumination of the approaching vehicle and thus to avoid any antiphase effects between the two vehicles. However, the transmission coefficient will possibly allow for a luminosity level. In this respect, it will be noted that, according to the invention, the synchronization between the transmission coefficient and the light emission of the one or more light sources is advantageously active, apart from in cases such as that given above, which is merely an example.

Advantageously and according to the invention, the pulsed signal is periodic and of period T.

Advantageously and according to the invention, the average of the pulsed signal during the period T after modification of the signal is the same as the average of the pulsed signal during the same period T before modification of the signal. The synchronization is thus advantageously not lost.

According to this aspect of the invention, any modification made to the signal will have no effect on the average value of the relevant quantities. In particular, the average power of the light emission will be constant whatever the modification, thereby making it possible for the driver to benefit from the same luminosity, and regulations in terms of illumination to be met.

Advantageously and according to the invention, the assisting device is configured to detect simultaneously a plurality of vehicles equipped with the device of the same type and to operate in a network with the vehicles. It is thus possible to modify the pulsed signals of all of the vehicles consistently with the objective to be achieved.

Advantageously and according to the invention, the device comprises a control unit suitable for transmitting the pulsed signal to the illuminating device and/or to the variable transmission screen. The control unit will possibly also be suitable for managing and exploiting the inter-vehicle communication.

Advantageously and according to the invention, the control unit comprises an emitter of remote-control waves able to transmit the pulsed signal to a receiver of the variable transmission screen, the receiver being able to control the transmission coefficient of the variable transmission screen.

Advantageously and according to the invention, the remote-control wave emitter is configured to transmit the pulsed signal using a wireless communication protocol.

Advantageously and according to the invention, the pulsed signal is pulse width modulated (PWM).

Advantageously and according to the invention, the variable transmission screen is formed:
  by the windshield of the vehicle,
  by a screen placed between the windshield of the vehicle and the driver of the vehicle, or
  by a pair of glasses worn by the driver of the vehicle.

The invention also relates to a method for assisting with driving an automotive vehicle, the vehicle being equipped with at least one illuminating device able to emit a beam for illuminating a road scene in front of the vehicle, and a variable transmission screen that is intended to be placed between the road scene and a driver of the vehicle, the method comprising a step of controlling, in relation to each other, a light emission of at least one light source of the illuminating device and a transmission coefficient of the variable transmission screen, with a pulsed signal.

According to the invention, the method contains a step of detecting a vehicle implementing a method of the same type, via inter-vehicle communication, especially by wireless data exchange, and a step of modifying the pulsed signal so as to avoid antiphase and/or phase effects, when such a vehicle is detected.

A method according to the invention therefore makes it possible to prevent antiphase and phase effects by modification of the pulsed signal if a vehicle implementing a method of the same type is present nearby.

Advantageously and according to the invention, the step of detecting the approach of a vehicle comprises a step of detecting the frequency and phase of the illuminating beam of the approaching vehicle.

Advantageously and according to the invention, the modifying step comprises a step of shifting the phase of the pulsed signal.

Advantageously and according to the invention, the phase-shift value (Phi) is chosen pseudo-randomly.

Advantageously and according to the invention, the step of controlling the transmission coefficient maximizes the transmission coefficient so that the screen is transparent during the approach of a vehicle implementing a method of the same type.

Advantageously and according to the invention, the pulsed signal is periodic and of period T during operation of the synchronized control.

Advantageously and according to the invention, the average of the pulsed signal during the period T after the modifying step is the same as the average of the pulsed signal during the same period T before the modifying step.

Advantageously and according to the invention, the assisting method comprises a step of transmitting the pulsed signal to the illuminating device and to the variable transmission screen.

Advantageously and according to the invention, the step of transmitting the pulsed signal is carried out using a wireless communication protocol.

Advantageously and according to the invention, the pulsed signal is pulse width modulated.

Advantageously and according to the invention, the method comprises steps of:
  emitting a recognition signal in case of detection of a vehicle implementing a method of the same type; known as a detected vehicle; and
  receiving a receipt acknowledgement signal from the detected vehicle;
    the step of modifying the pulsed signal taking place on receipt of the receipt acknowledgement.

Advantageously and according to the invention, the method comprises a step of simultaneously detecting a plurality of vehicles implementing the method and a step of operating in a network with the vehicles.

The invention also relates to an assisting device and an assisting method that are characterized in combination by all or some of the features mentioned above or below.

These and other objects and advantages of the invention will be apparent from the following description, the accompanying drawings and the appended claims.

BRIEF DESCRIPTION OF THE ACCOMPANYING DRAWINGS

Other aims, features and advantages of the invention will become apparent on reading the following solely nonlimiting description given with reference to the appended figures, in which.

DETAILED DESCRIPTION OF THE PREFERRED EMBODIMENTS

Figure 1:
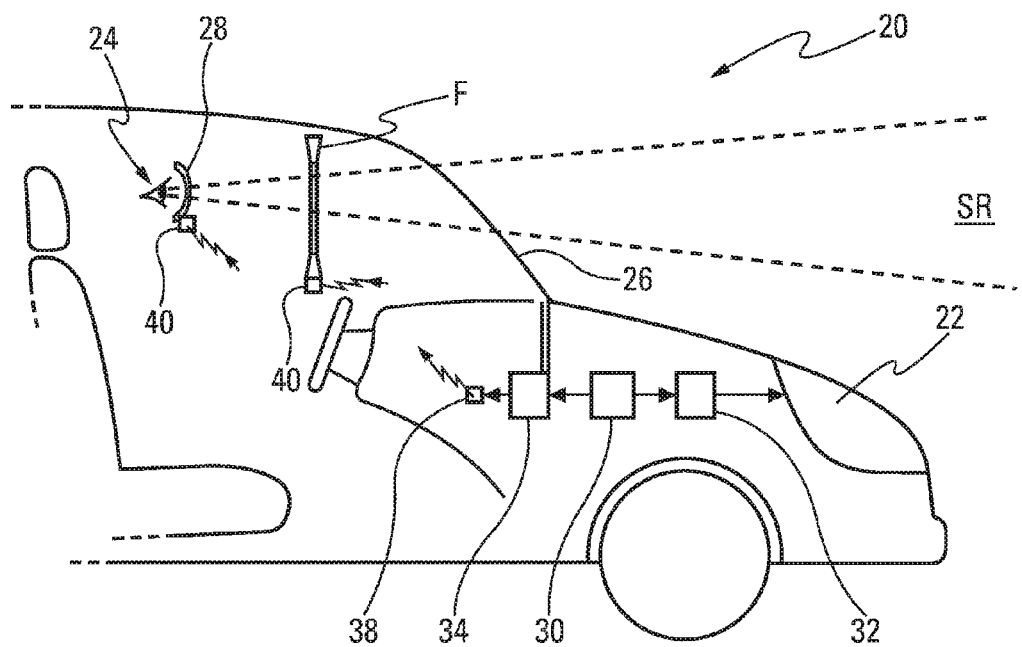
FIG. 1 is a schematic partial cross-sectional view of a vehicle comprising a device for assisting with driving according to one embodiment of the invention.

FIG. 1 schematically shows a partial cross section through a vehicle 20 comprising a device for assisting with driving according to one embodiment of the invention. The vehicle 20 is, as is conventional, equipped with an illuminating device 22 able to emit a beam for illuminating a road scene SR by virtue of a light source, and is controlled by a driver 24, symbolized by his eye. The road scene SR corresponds to what the driver 24 of the vehicle 20 observes. The driver 24 here observes the road scene SR in front of the vehicle 20 and through a windshield 26.

A variable transmission screen is placed in the field of view of the driver 24, between the latter and the road scene SR. According to various embodiments of the invention, the variable transmission screen may comprise:
  of an actual screen F placed between the driver 24 and the windshield 26, for example able to be raised in the same way as a sun visor,
  of the windshield 26 itself, or
  of a pair of glasses 28 worn by the driver 24 in a similar way to sunglasses or corrective spectacles, a single lens having been shown in FIG. 1.

These three embodiments have all been shown in FIG. 1, for ease of illustration. They are however only variant embodiments, each of them tending to obtain the same result. In the rest of the description, the expression "variable transmission screen" will be used to designate any one of these three embodiments.

Whatever the embodiment, the assisting device, when it is active (i.e. in operation), controls the transmission coefficient of the variable transmission screen F, 26, 28 and the light source of the illuminating device 22 of the vehicle 20. This control is carried out synchronously, at least when no vehicle equipped with a device of the same type is present nearby. One objective to be achieved thereby is for the transmission coefficient of the variable transmission screen F, 26, 28 to be at its maximum (i.e. for the transparency of the variable transmission screen F, 26, 28 to be at its maximum) when the illuminating device 22 is emitting light, and therefore for the driver 24 to see the road scene SR illuminated by his illuminating device 22. Another objective to be achieved thereby is for the transmission coefficient of the variable transmission screen F, 26, 28 to be at its minimum (i.e. for the transparency of the variable transmission screen F, 26, 28 to be at its minimum) when the illuminating device 22 is not emitting light, and therefore for exterior lights illuminating the road scene SR to be attenuated, in particular those of approaching vehicles.

To do this, the device here comprises a microcontroller or control unit 30 that generates a pulsed signal intended for controlling the illuminating device 22 and the variable transmission screen F, 26, 28.

The control unit 30 will possibly be connected to a management circuit 32 that controls the power supply of the light-emitting device so that the device emits a beam of an intensity that varies periodically between a maximum value and a minimum value, varying depending on the pulsed signal.

Figure 2:
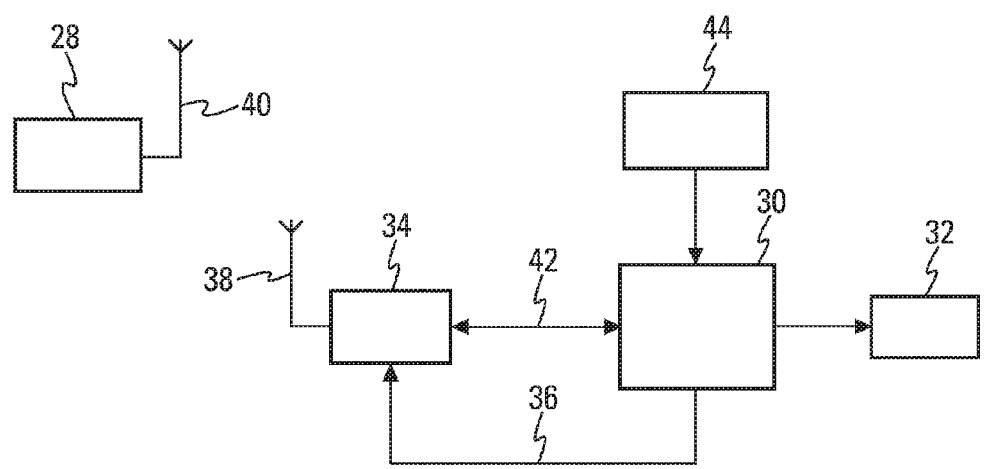
FIG. 2 is a schematic view of the assisting device in FIG. 1 according to one embodiment of the invention.

The control unit 30 will possibly also be connected to a circuit 34 controlling the transmission coefficient, for the transmission of the pulsed signal. The supply of electrical power and control signals is represented in FIG. 2 by a link 36. If the variable transmission screen F, 26, 28 is movable or remote from the control unit 30 (in the case of use of a pair of glasses 28 or of the screen F for example), the pulsed signal may be transmitted via a wireless link, using a given wireless communication protocol, such as, for example, a protocol according to the standard IEEE 802.15.1 and all its extensions (commonly denominated by the registered trademark Bluetooth) or the standard IEEE 802.11 (commonly denominated by the registered trademark Wi-Fi).

If the pulsed signal is transmitted wirelessly from the control unit 30 to the variable transmission screen F, 26, 28, the circuit 34 controlling the transmission coefficient comprises, for example, an emitter 38 of remote-control waves, and the variable transmission screen F, 26, 28 is provided, for example, with a receiver 40 of the same remote-control waves. The receiver 40 then controls the variable transmission coefficient of the variable transmission screen F, 26, 28, in the sense that it applies to the variable transmission screen F, 26, 28 the set controls corresponding to the pulsed signa.

FIG. 2 is a schematic view of the assisting device according to one embodiment of the invention employing wireless transmission.

The control unit 30 comprises a microcontroller that delivers a pulsed signal of fixed frequency and zero phase shift. This unmodified pulsed signal is transmitted to the circuit 34 controlling the transmission coefficient by way of a connection 42, and is transmitted to the management circuit 32.

The control unit 30 also receives data originating from means 44 for exchanging data wirelessly between vehicles. The means 44 are configured to emit and receive data, in particularly identifying data, to or from vehicles comprising the same equipment. It will possibly in particular be a question of exchanges of data using the aforementioned standard known by the name "Bluetooth". When the means 44 for exchanging data receive data from another vehicle, the device then knows that a vehicle equipped with a device of the same type is nearby and that the pulsed signal of one at least of the two vehicles must be modified. In addition to the identification of pulsed light signals, the means 44 for exchanging data will possibly be configured to determine the frequency and/or phase of the light beam of the approaching vehicle.

If no approaching vehicle is detected, the microcontroller 30 continues to deliver the unmodified pulsed signal to the circuit 34 controlling the transmission coefficient and to the management circuit 32. If an approaching vehicle equipped with a device of the same type is detected, the microcontroller 30 may use the data relating to the frequency and phase of the light beam of the approaching vehicle to suitably modify the pulsed signal.

For example, the modification may consist in a change of frequency and/or phase, the frequency and phase of the approaching vehicle being known.

In one embodiment, the modification may consist in only a phase shift, thereby making it possible to work at a fixed frequency. The phase shift may be chosen depending on the phase of the approaching vehicle, or indeed pseudo-randomly in order to prevent, if the approaching vehicle also makes a phase modification following detection of the approach, the phase shifts used by the two vehicles from being identical.

In another embodiment, especially in the case where the vehicles are detected to be in antiphase, the microcontroller 30 may decide to send a command to the circuit 34 controlling the transmission coefficient, for example via the connection 42, and, on receipt of this command, the circuit 34 controlling the transmission coefficient will set the transmission coefficient of the variable transmission screen F, 26, 28 to its maximum throughout the duration of the approach. According to another embodiment, the microcontroller 30 may decide to suspend the transmission of the pulsed signal to the circuit 34 controlling the transmission coefficient, and instead transmit a continuous signal in order to increase the transmission coefficient of the variable transmission screen F, 26, 28 to its maximum, i.e. in order to increase the transparency of the variable transmission screen F, 26, 28 to its maximum. In the latter case, the synchronization of the control of the light source of the illuminating device 22 and the transmission coefficient of the variable transmission screen F, 26, 28 is suspended during the approach period. Thus, the variable transmission screen F, 26, 28 remains at its maximum transparency while a pulsed illumination is preserved. The driver 24 then benefits from the road scene SR without attenuation of luminosity, whatever the light source. The luminosity level will possibly advantageously also be taken into account when adjusting the transmission coefficient.

This being so, it will possibly be advantageous for only one of the two approaching vehicles to modify its pulsed signal in order to prevent the same modification from being implemented by both vehicles. To this end, the device is configured:

to emit a recognition signal in case of detection of a vehicle equipped with a device of the same type, known as a detected vehicle;

to receive a receipt acknowledgement signal from the detected vehicle; and to modify the pulsed signal on receipt of the receipt acknowledgement.

In parallel, the device of the vehicle that emitted the receipt acknowledgement will abstain from modifying its pulsed signal.

The assisting device will possibly also be configured to allow for the presence of a plurality of vehicles operating in a network.

The fact that the assisting device according to the invention uses means 44 for exchanging data wirelessly between vehicles to detect vehicles equipped with a device of the same type especially ensures the device has a good anticipation: specifically inter-vehicle communication allows approaching vehicles to be detected at a large distance, at least equal to or larger than the range of the high beams of the approaching vehicles, and therefore the pulsed signal to be modified according to the invention before phase and/or antiphase effects appear, optical sensors for example not allowing this to be achieved.

Figure 3:
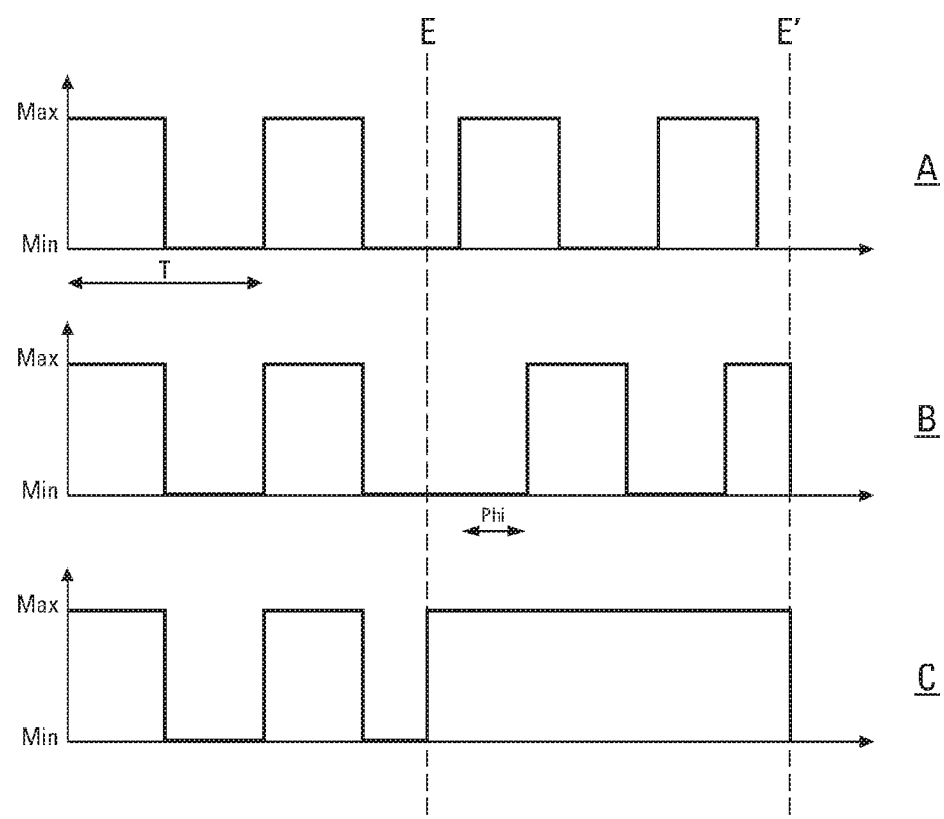
FIG. 3 is a graph of the temporal variations of various signals emitted by a device according to the invention, in the case of approach of a vehicle equipped with a device of the same type.

FIG. 3 is a graph of the temporal variations of various signals in the case where the vehicle 20 equipped with a device of the same type is approaching. In these graphs, the start of the "approach of a vehicle equipped with a device of the same type" event is represented by the dashed line referenced E. In contrast, the end of this event is represented by the dashed line referenced E'. Three signals are shown: A is a pulsed signal that does not undergo modification, and that furthermore serves as a reference showing the usual behavior of the signal when no approach is detected. B is a pulsed signal after the application of one type of modification following the detection of an approaching vehicle represented by the event E. Lastly, C is a signal transmitted by the circuit 34 controlling the transmission coefficient to the variable transmission screen F, 26, 28, after the application of another type of modification following the detection of an approaching vehicle represented by the event E.

The signal A is a periodic pulsed signal of period T and of a duty cycle of 0.5, i.e. the signal is at its maximum level during half the period, namely T/2. Since the signal A is a pulsed signal that does not undergo modification, it may equally well represent the pulsed signal of an approaching vehicle equipped with a device of the same type that does not detect the approach of the vehicle 20 equipped with an assisting device according to the invention and that therefore does not make any modifications to its pulsed signal. The time interval between the event E and the event E' in this case corresponds to the time interval during which the vehicles are approaching and are therefore liable to be subject to effects due to their pulsed signals being in antiphase and/or phase if no modification is made to at least one thereof.

The signal B is a periodic pulsed signal of period T and of a duty cycle of 0.5, modified according to a first embodiment of the invention: this signal B is a pulsed signal that is modified by applying a phase shift Phi, on approach of a vehicle equipped with a device of the same type, represented by the event E. This phase shift allows, between the event E and the event E', the phase of the signal to be modified so that it is no longer in antiphase or phase with an approaching vehicle. Comparing the signal A and the signal B, the signals are in phase before the event E and after the event E', but this phase matching is prevented between the event E and the event E', i.e. while the two vehicles are approaching each other. Here, synchronization is not lost and the pulsed signal B is used both for the transmission coefficient and the illumination.

The signal C is the signal transmitted by the circuit 34 controlling the transmission coefficient to the variable transmission screen F, 26, 28, modified by a second embodiment of the invention: when a vehicle equipped with a device of the same type is not approaching, i.e. before the event E and after the event E', the signal C is identical to the pulsed signal transmitted by the microcontroller. During an approach, i.e. between the event E and the event E', the microcontroller will send a command to the circuit 34 controlling the transmission coefficient, for example via the connection 42, and, on receipt of this command, the circuit 34 controlling the transmission coefficient will set the transmission coefficient of the variable transmission screen F, 26, 28 to its maximum throughout the duration of the approach. The variable transmission screen F, 26, 28 is thus at its maximum transparency throughout the entire approach period. This modification is particularly appropriate when the vehicles are in antiphase: the fact that the transparency of the variable transmission screen F, 26, 28 is maximized allows all exterior lights, and therefore those of the approaching vehicle, to be seen perfectly.

Advantageously, the device according to the invention implements the method according to the invention.

Advantageously, the method according to the invention is implemented by the device according to the invention.

Advantageously, the step of transmitting the pulsed signal is implemented by the emitter 38 of remote-control waves of the assisting device according to the invention.

Advantageously, the emitter 38 of remote-control waves of the assisting device according to the invention implements the step of transmitting the pulsed signal of the assisting method according to the invention.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. An assisting device for assisting with driving an automotive vehicle, said automotive vehicle including at least one illuminating device to emit a beam for illuminating a road scene in front of said automotive vehicle, the assisting device comprising:
a variable transmission screen that is placed between said road scene and a driver of said automotive vehicle, the assisting device being configured to, when active, control a light emission of at least one light source of said at least one illuminating device and a transmission coefficient of said variable transmission screen, in relation to each other, with a pulsed signal, wherein the assisting device is configured to detect a vehicle equipped with another assisting device of a same type to the assisting device via inter-vehicle communication and to modify said pulsed signal to avoid antiphase and/or phase effects, when the assisting device detects such a vehicle, and the assisting device is configured to emit a recognition signal via the inter-vehicle communication when the vehicle equipped with the another assisting device of the same type, known as a detected vehicle, is detected.

2. The assisting device as claimed in claim 1, wherein the assisting device includes an emitter and receiver to exchange data wirelessly between vehicles.

3. The assisting device as claimed in claim 2, wherein the assisting device determines a frequency and/or a phase of the illuminating beam originating from an approaching vehicle equipped with the another assisting device of the same type.

4. The assisting device as claimed in claim 2, wherein the assisting device is configured to modify said pulsed signal by applying a phase shift thereto.

5. The assisting device as claimed in claim 2, wherein the assisting device is configured to control said transmission coefficient of said variable transmission screen so that a transparency of said variable transmission screen is maximized when an illuminating beam originating from an approaching vehicle equipped with the another assisting device of the same type is detected.

6. The assisting device as claimed in claim 2, wherein the assisting device is configured to detect simultaneously a plurality of vehicles equipped with the another assisting device of the same type and to operate in a network with said plurality of vehicles.

7. The assisting device as claimed in claim 1, wherein the assisting device determines a frequency and/or a phase of the illuminating beam originating from an approaching vehicle equipped with the another assisting device of the same type.

8. The assisting device as claimed in claim 1, wherein the assisting device is configured to modify said pulsed signal by applying a phase shift thereto.

9. The assisting device as claimed in claim 8, wherein a phase-shift value (Phi) is chosen pseudo-randomly.

10. The assisting device as claimed in claim 8, wherein the assisting device is configured to detect simultaneously a plurality of vehicles equipped with the another assisting device of the same type and to operate in a network with said plurality of vehicles.

11. The assisting device as claimed in claim 1, wherein the assisting device is configured to control said transmission coefficient of said variable transmission screen so that a transparency of said variable transmission screen is maximized when an illuminating beam originating from an approaching vehicle equipped with the another assisting device of the same type is detected.

12. The assisting device as claimed in claim 1, wherein the assisting device is configured:
to receive a receipt acknowledgement signal from said detected vehicle; and
to modify said pulsed signal on receipt of said receipt acknowledgement.

13. The assisting device as claimed in claim 1, wherein the assisting device is configured to detect simultaneously a plurality of vehicles equipped with the another assisting device of the same type and to operate in a network with said plurality of vehicles.

14. A method for assisting with driving an automotive vehicle, said automotive vehicle including at least one illuminating device to emit a beam for illuminating a road scene in front of said automotive vehicle, and a variable transmission screen that is intended to be placed between said road scene and a driver of said automotive vehicle, the method comprising controlling, in relation to each other, a light emission of at least one light source of said at least one illuminating device and a transmission coefficient of said variable transmission screen, with a pulsed signal, wherein the method comprises detecting a vehicle implementing another method for assisting with driving the vehicle of a same type, via inter-vehicle communication, and modifying said pulsed signal so as to avoid antiphase and/or phase effects, when such a vehicle is detected, and the method comprises emitting a recognition signal via the inter-vehicle communication when the vehicle implementing the another method of the same type, known as a detected vehicle, is detected.

15. The method as claimed in claim 14, wherein said detecting the vehicle comprises detecting a frequency and phase of said illuminating beam of an approaching vehicle.

16. The method as claimed in claim 14, wherein said modifying said pulsed signal comprises shifting a phase of said pulsed signal.

17. The method as claimed in claim 16, wherein a phase-shift value (Phi) is chosen pseudo-randomly.

18. The method as claimed in claim 14, wherein controlling said transmission coefficient maximizes said transmission coefficient so that said variable transmission screen is transparent during the approach of said vehicle implementing the another method of the same type.

19. The method as claimed in claim 14, wherein said assisting method comprises: and receiving a receipt acknowledgement signal from said detected vehicle;

modifying said pulsed signal taking place on receipt of said receipt acknowledgement.

20. The method as claimed in claim 14, wherein the method comprises simultaneously detecting a plurality of equipped vehicles implementing the another method and operating in a network with said plurality of equipped vehicles.

* * * * *